United States Patent
Venkatesh

(10) Patent No.: US 11,681,777 B2
(45) Date of Patent: *Jun. 20, 2023

(54) OPTIMIZATION FOR DECONVOLUTION

(71) Applicant: Meta Platforms Technologies, LLC, Menlo Park, CA (US)

(72) Inventor: Ganesh Venkatesh, San Jose, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/571,946

(22) Filed: Jan. 10, 2022

(65) Prior Publication Data

US 2022/0129524 A1 Apr. 28, 2022

Related U.S. Application Data

(63) Continuation of application No. 16/513,389, filed on Jul. 16, 2019, now Pat. No. 11,222,092.

(51) Int. Cl.
| | | |
|---|---|---|
| *G06F 17/16* | (2006.01) | |
| *G06N 3/04* | (2023.01) | |
| *G06N 3/08* | (2023.01) | |
| *G06T 3/40* | (2006.01) | |

(52) U.S. Cl.
CPC .............. *G06F 17/16* (2013.01); *G06N 3/04* (2013.01); *G06N 3/08* (2013.01); *G06T 3/4023* (2013.01); *G06T 3/4053* (2013.01)

(58) Field of Classification Search
CPC . G06F 17/16; G06N 3/04; G06N 3/08; G06N 3/0454; G06T 3/4023; G06T 3/4053
See application file for complete search history.

(56) References Cited

U.S. PATENT DOCUMENTS

| | | | |
|---|---|---|---|
| 5,689,346 A | * | 11/1997 | Noda .................... G06F 17/147 348/250 |
| 10,817,260 B1 | | 10/2020 | Huang et al. |
| 10,990,650 B1 | | 4/2021 | Vantrease et al. |

(Continued)

FOREIGN PATENT DOCUMENTS

WO 2016130203 A1 8/2016

OTHER PUBLICATIONS

Chih C-Y., et al., "Accurate and Bandwidth Efficient Architecture for CNN-based Full-HD Super-Resolution," IEEE International Symposium on Circuits and Systems (ISCAS), May 27, 2018, 5 Pages.

(Continued)

*Primary Examiner* — Xuemei G Chen
(74) *Attorney, Agent, or Firm* — Foley & Lardner LLP

(57) ABSTRACT

Disclosed herein includes a system, a method, and a device for improving computational efficiency of deconvolution by reducing a number of dot products. In one aspect, an input image having a set of pixels is received. A first dot product may be performed on a subset of the set of pixels of the input image and a portion of a kernel, to generate a first pixel of an output image. A number of multiplications performed for the first dot product performed may be less than a number of elements of the kernel. A second dot product on a remaining portion of the kernel to generate the first pixel of the output image may be bypassed.

18 Claims, 8 Drawing Sheets

(56) References Cited

U.S. PATENT DOCUMENTS

| | | | |
|---|---|---|---|
| 2013/0073599 A1* | 3/2013 | Maloney | G06F 17/16 708/514 |
| 2016/0328630 A1 | 11/2016 | Han et al. | |
| 2017/0011288 A1 | 1/2017 | Brothers et al. | |
| 2018/0089562 A1 | 3/2018 | Jin et al. | |
| 2018/0129893 A1 | 5/2018 | Son et al. | |
| 2018/0144209 A1 | 5/2018 | Kim et al. | |
| 2018/0164866 A1 | 6/2018 | Turakhia et al. | |
| 2018/0181864 A1 | 6/2018 | Mathew et al. | |
| 2018/0189056 A1 | 7/2018 | Turakhia et al. | |
| 2018/0285715 A1 | 10/2018 | Son et al. | |
| 2018/0322390 A1 | 11/2018 | Das et al. | |
| 2019/0026078 A1 | 1/2019 | Bannon et al. | |
| 2019/0114542 A1* | 4/2019 | Kim | G06N 3/08 |
| 2019/0171930 A1* | 6/2019 | Lee | G06N 3/04 |
| 2019/0205358 A1* | 7/2019 | Diril | G06F 17/16 |
| 2019/0228285 A1 | 7/2019 | Zhang et al. | |
| 2019/0278828 A1 | 9/2019 | Park et al. | |
| 2019/0303757 A1 | 10/2019 | Wang et al. | |
| 2019/0340488 A1 | 11/2019 | Fishel et al. | |
| 2019/0340510 A1 | 11/2019 | Li et al. | |
| 2019/0392287 A1 | 12/2019 | Ovsiannikov et al. | |
| 2020/0234124 A1 | 7/2020 | Park | |
| 2020/0293282 A1 | 9/2020 | Fais et al. | |
| 2020/0293770 A1 | 9/2020 | Chen et al. | |
| 2020/0342294 A1 | 10/2020 | Jang | |
| 2020/0401895 A1* | 12/2020 | Litvak | G06F 7/5443 |
| 2020/0410036 A1 | 12/2020 | Huynh et al. | |
| 2021/0011970 A1 | 1/2021 | Han | |
| 2021/0035258 A1 | 2/2021 | Ray et al. | |
| 2021/0110235 A1 | 4/2021 | Hoang et al. | |
| 2021/0125046 A1 | 4/2021 | Moshovos et al. | |
| 2021/0125070 A1 | 4/2021 | Wang et al. | |

OTHER PUBLICATIONS

Collobert R., et al., "Implementing Neural Networks Efficiently," Big Data Analytics in the Social and Ubiquitous Context: 5th International Workshop on Modeling Social Media, 5th International Workshop on Mining Ubiquitous and Social Environments, and First International Workshop on Machine, 2012, pp. 537-557, XP047388465, Retrieved from the Internet: URL: http://www.icsi.berkeley.edu/Speech/qn.html.

International Search Report and Written Opinion for International Application No. PCT/US2020/041384, dated Nov. 16, 2020, 09 Pages.

Lavin A., "MaxDNN: An Efficient Convolution Kernel for Deep Learning with Maxwell GPUs," arxiv.org, Cornell University Library, NY 14853, Jan. 27, 2015, 7 Pages, XP080675338.

* cited by examiner

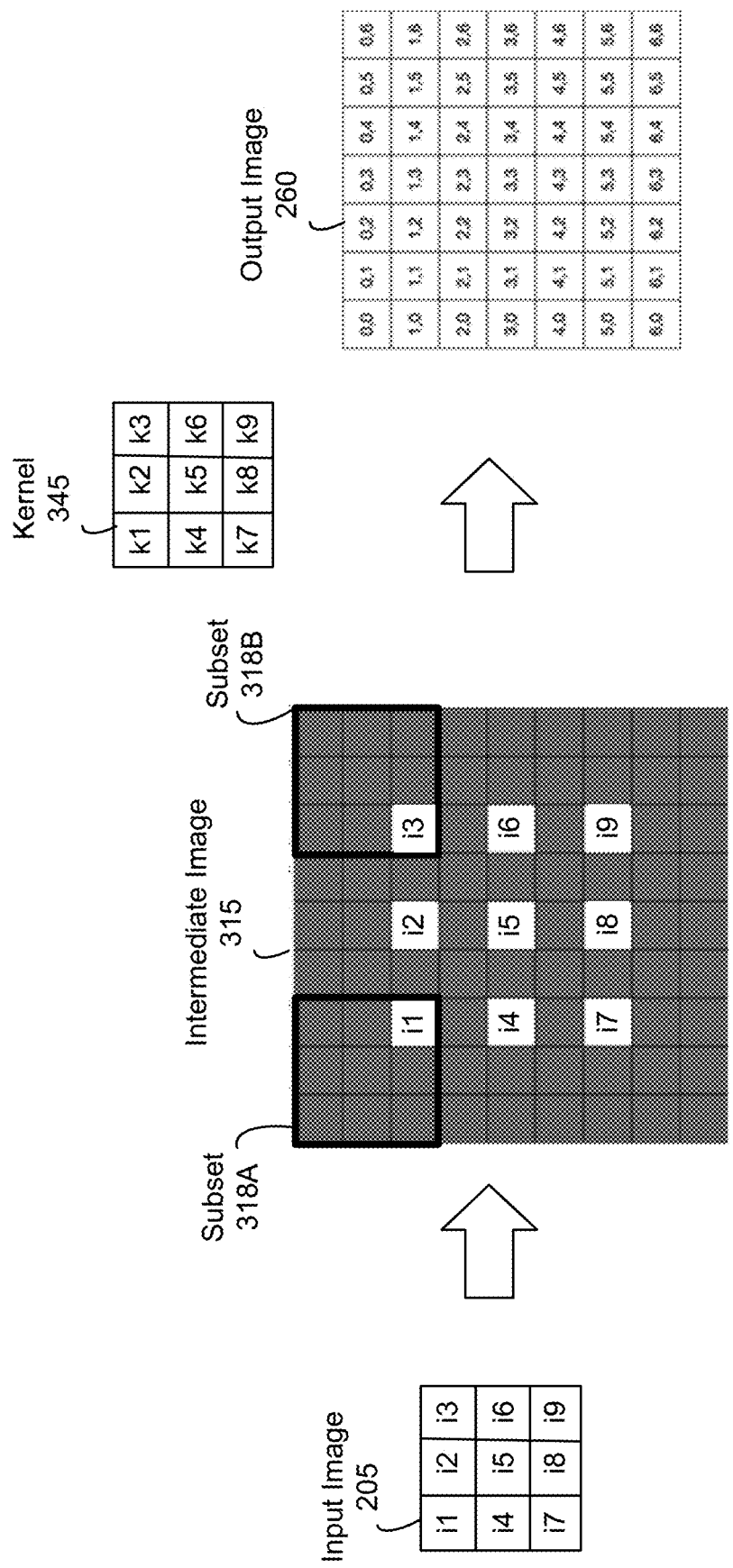

OPTIMIZATION FOR DECONVOLUTION

CROSS-REFERENCE TO RELATED APPLICATION

This application is a continuation of U.S. patent application Ser. No. 16/513,389 filed on Jul. 16, 2019, which is incorporated by reference herein in its entirety.

FIELD OF DISCLOSURE

The present disclosure is generally related to a deconvolution operation, including but not limited to improving computational efficiency of deconvolution by reducing an amount of computations for dot product operations.

BACKGROUND

Deconvolution enables improving resolutions or upscaling of images. In one implementation, based on an input image having a set of pixels, an intermediate image having a larger number of pixels than the input image is obtained by padding or adding pixels having a predetermined values (e.g., null data) to the set of pixels of the input image. Then, the intermediate image may be convolved with a kernel to obtain pixels of an upscaled image with a higher resolution than the input image. For example, dot product operations can be performed on different subsets of the intermediate image and the kernel. However, generating the intermediate image and convolving the intermediate image with the kernel may involve numerous dot product operations, which are computationally exhaustive and inefficient.

SUMMARY

Various embodiments disclosed herein are related to a method for performing a deconvolution on an input image. In some embodiments, the method includes receiving, by one or more processors, the input image having a set of pixels. In some embodiments, the method includes performing, by the one or more processors, a first dot product on a subset of the set of pixels of the input image and a portion of a kernel, to generate a first pixel of an output image. A number of multiplications performed for the first dot product may be less than a number of elements of the kernel. In some embodiments, the method includes bypassing, by the one or more processors, a second dot product on a remaining portion of the kernel to generate the first pixel of the output image.

In some embodiments, the method includes identifying, by the one or more processors according to mapping information indicating a corresponding dot product to bypass for each pixel of the output image, the second dot product to bypass for the first pixel of the output image. In some embodiments, the method includes bypassing, by the one or more processors according to the mapping information, the second dot product on the remaining portion of the kernel to generate the first pixel of the output image.

In some embodiments, the method includes identifying, by the one or more processors, according to mapping information indicating a corresponding dot product to perform for each pixel of the output image, the first dot product to perform for the first pixel of the output image. In some embodiments, the method includes performing, by the one or more processors according to the mapping information, the first dot product on the subset of the set of pixels of the input image and the portion of the kernel, to generate the first pixel of the output image. In some embodiments, the output image has more number of pixels than the input image.

In some embodiments, the method includes performing, by the one or more processors, a third dot product on i) the subset of the set of pixels of the input image and ii) another portion of the kernel to generate a second pixel of the output image. In some embodiments, the number of multiplications performed for the first dot product to generate the first pixel of the output image is same as a number of multiplications performed for the third dot product to generate the second pixel of the output image.

In some embodiments, the method includes performing, by the one or more processors, a third dot product on i) another subset of the set of pixels of the input image and ii) the portion of the kernel, to generate a second pixel of the output image. In some embodiments, the number of multiplications performed for the first dot product to generate the first pixel of the output image is same as a number of multiplications performed for the third dot product to generate the second pixel of the output image.

In some embodiments, the method includes performing, by the one or more processors, a third dot product on i) another subset of the set of pixels of the input image and ii) another portion of the kernel, to generate a second pixel of the output image. In some embodiments, the number of multiplications performed for the first dot product to generate the first pixel of the output image is different from a number of multiplications performed for the third dot product to generate the second pixel of the output image.

Various embodiments disclosed herein are related to a system for performing a deconvolution on an input image. In some embodiments, the system includes one or more processors configured to receive an input image having a set of pixels, and perform a first dot product on a subset of the set of pixels of the input image and a portion of a kernel, to generate a first pixel of an output image. A number of multiplications performed for the first dot product may be less than a number of elements of the kernel. In some embodiments, the one or more processors are configured to bypass a second dot product on a remaining portion of the kernel to generate the first pixel of the output image.

In some embodiments, the one or more processors are configured to identify, according to mapping information indicating a corresponding dot product to bypass for each pixel of the output image, the second dot product to bypass for the first pixel of the output image. In some embodiments, the one or more processors are configured to bypass, according to the mapping information, the second dot product on the remaining portion of the kernel to generate the first pixel of the output image.

In some embodiments, the one or more processors are configured to identify, according to mapping information indicating a corresponding dot product to perform for each pixel of the output image, the first dot product to perform for the first pixel of the output image. In some embodiments, the one or more processors are configured to perform, according to the mapping information, the first dot product on the subset of the set of pixels of the input image and the portion of the kernel, to generate the first pixel of the output image. In some embodiments, the output image has more number of pixels than the input image.

In some embodiments, the one or more processors are configured to perform a third dot product on i) the subset of the set of pixels of the input image and ii) another portion of the kernel to generate a second pixel of the output image. In some embodiments, the number of multiplications performed for the first dot product to generate the first pixel of the output image is same as a number of multiplications performed for the third dot product to generate the second pixel of the output image.

In some embodiments, the one or more processors are configured to perform a third dot product on i) another subset of the set of pixels of the input image and ii) the portion of the kernel to generate a second pixel of the output image. In some embodiments, the number of multiplications performed for the first dot product to generate the first pixel of the output image is same as a number of multiplications performed for the third dot product to generate the second pixel of the output image.

In some embodiments, the one or more processors are configured to perform a third dot product on i) another subset of the set of pixels of the input image and ii) another portion of the kernel to generate a second pixel of the output image. In some embodiments, the number of multiplications performed for the first dot product to generate the first pixel of the output image is different from a number of multiplications performed for the third dot product to generate the second pixel of the output image.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 3 shows an example input image, an intermediate image, and an upscaled image to illustrate a process of upscaling according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for performing efficient deconvolution by reducing an amount of computations for dot product operations.

A. Environment for Artificial Intelligence Related Processing

Figure 1A:
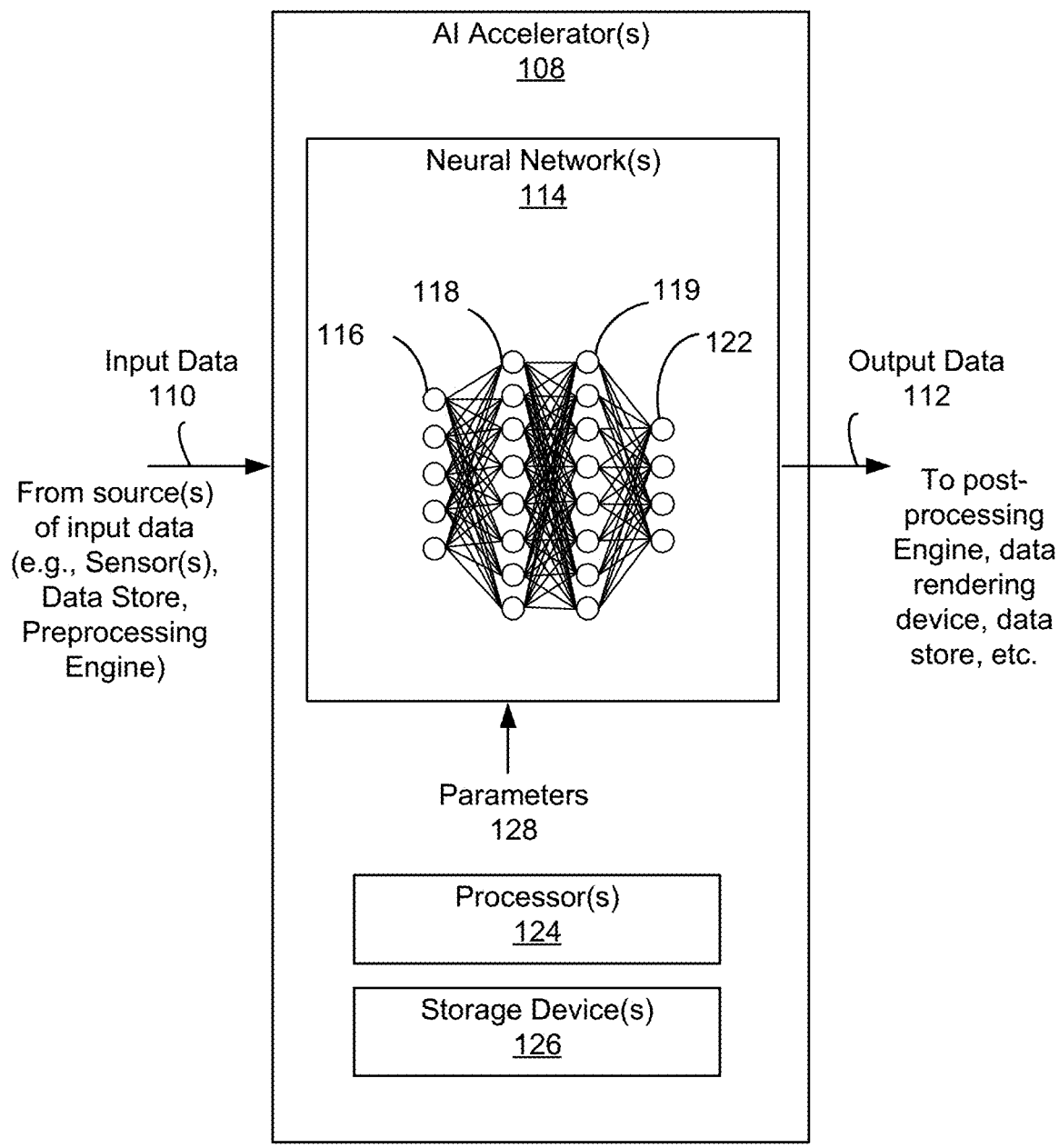
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) 24 and/or one or more storage devices 126.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing, forming, building, synthesizing and/or establishing the neural network using architectures that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, setting appropriate parameters 128 for the neural network(s) 114 based on a tuning or training process and the objective of the neural network(s) and/or the system, can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represent some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduce the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically, the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122 for example. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information from a training phase for example, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108, in parallel for example), sequential processing (e.g., on the same component of an AI accelerator 108, at different times or stages), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics related, internet of things (IoT) related, and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
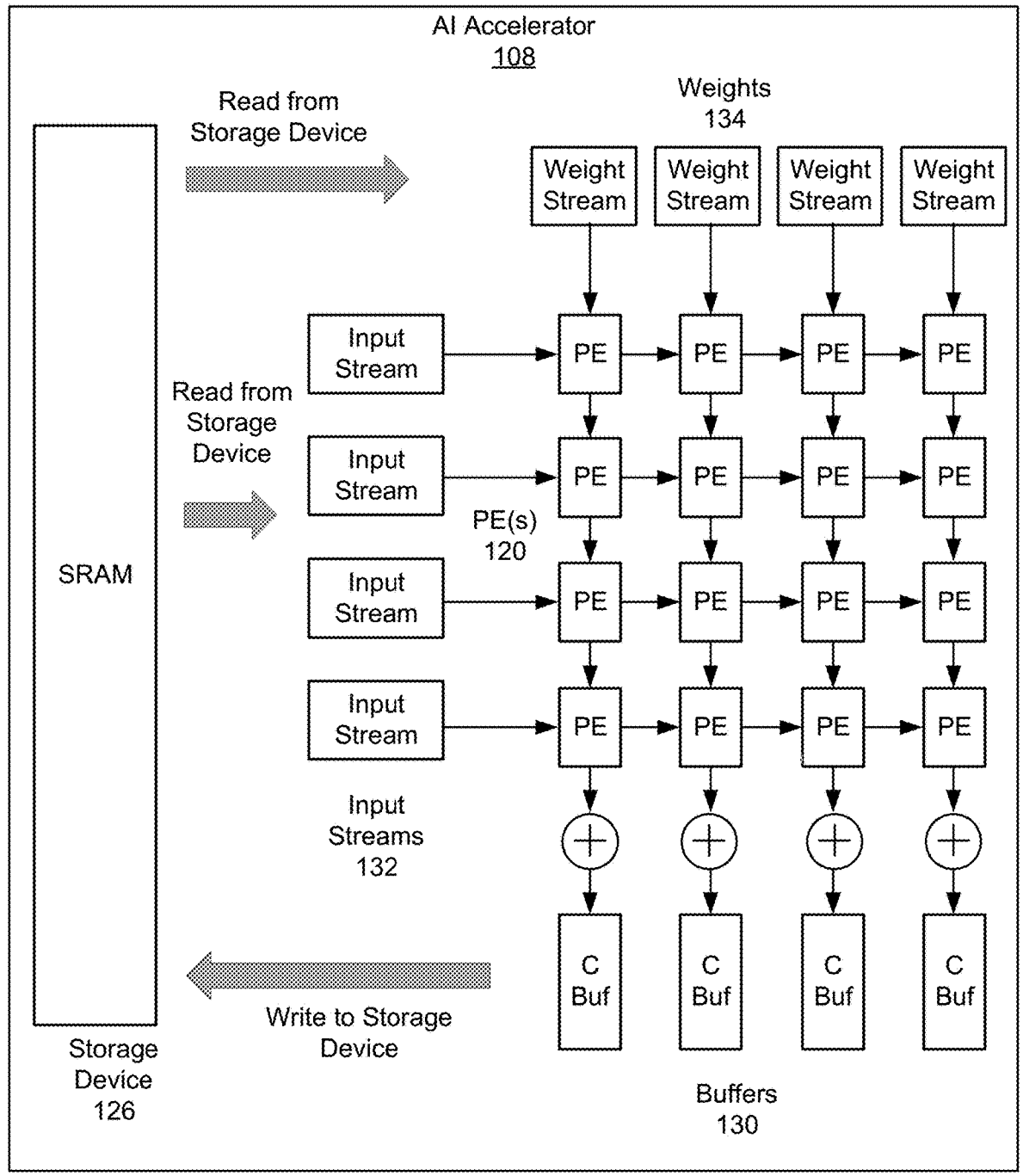
FIG. 1B is a block diagram of an embodiment of a device for performing AI related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The neuron can be implemented as a corresponding PE circuit, and the processing/activation that can occur at the neuron can be performed at the PE circuit. The PEs are connected into a particular network pattern or array, with different patterns serving different functional purposes. The PE in an artificial neural network operate electrically (e.g., in the embodiment of a semiconductor implementation), and may be either analog, digital, or a hybrid. To parallel the effect of a biological synapse, the connections between PEs can be assigned multiplicative weights, which can be calibrated or "trained" to produce the proper system output.

A PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some neural networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

In some embodiments, the PEs can be arranged and/or implemented as a systolic array. A systolic array can be a network (e.g., a homogeneous network) of coupled data processing units (DPUs) such as PEs, called cells or nodes. Each node or PE can independently compute a partial result as a function of the data received from its upstream neighbors, can store the result within itself and can pass the result downstream for instance. The systolic array can be hardwired or software configured for a specific application. The nodes or PEs can be fixed and identical, and interconnect of the systolic array can be programmable. Systolic arrays can rely on synchronous data transfers.

Referring again to FIG. 1B, the input x to a PE 120 can be part of an input stream 132 that is read or accessed from a storage device 126 (e.g., SRAM). An input stream 132 can be directed to one row (horizontal bank or group) of PEs, and can be shared across one or more of the PEs, or partitioned into data portions (overlapping or non-overlapping data portions) as inputs for respective PEs. Weights 134 (or weight information) in a weight stream (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE (e.g., without passing through other PE(s)), or can be routed through one or more PEs (e.g., along a row or column of PEs) to the target PE. The output of each PE can be routed directly out of the PE array (e.g., without passing through other PE(s)), or can be routed through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored by the storage device 126 can be retrieved or read from the storage device 126, and be used as inputs to the array of PEs 120 for processing (of a subsequent layer of the neural network) at a later time. In certain embodiments, the outputs that are stored by the storage device 126 can be retrieved or read from the storage device 126 as output data 112 for the AI accelerator 108.

Figure 1C:
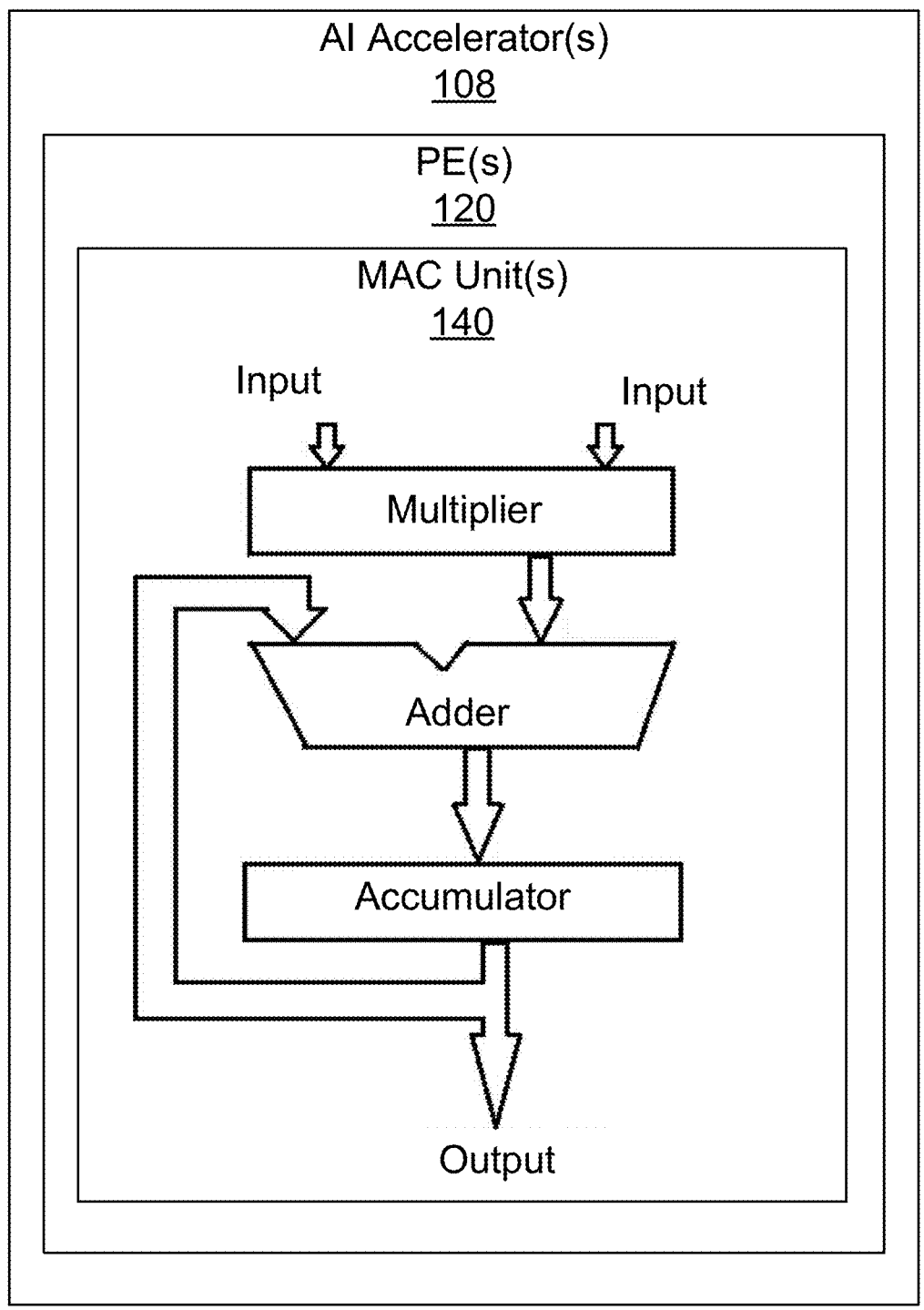
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to (singly or collectively) as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator operand a, and inputs b and c:

$$a \leftarrow a + (b \times c) \quad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the accumulator register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator. An array or plurality of MAC units 140 (e.g., in PEs) can be arranged in a systolic array, for parallel integration, convolution, correlation, matrix multiplication, data sorting, and/or data analysis tasks.

Figure 1D:
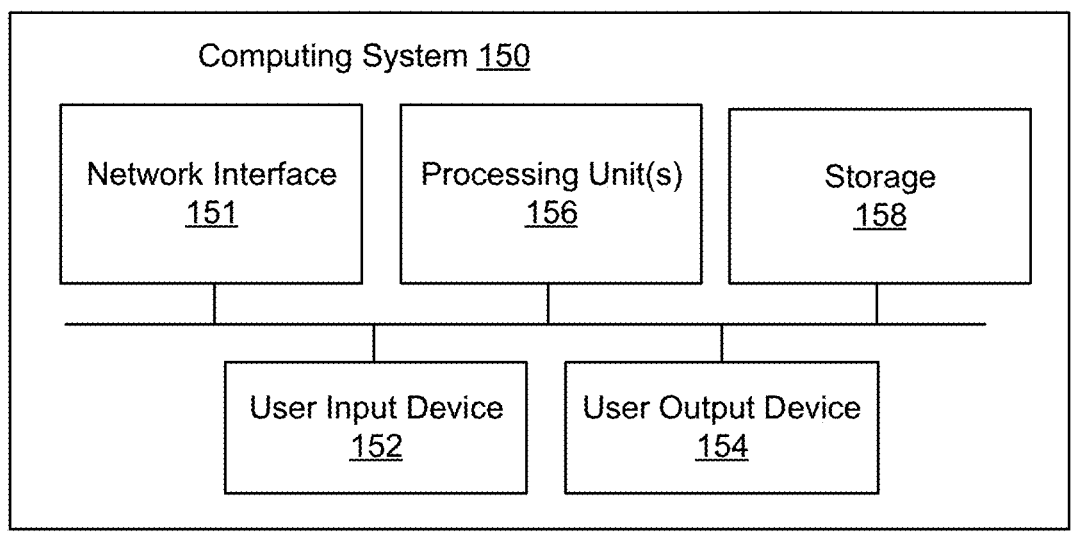
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 (or processors 156) of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. User output devices 154 can be provided in addition to or instead of a display. Examples include indicator lights, speakers, tactile "display" devices, printers, and so on.

Some implementations include electronic components, such as microprocessors, storage and memory that store computer program instructions in a non-transitory computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

B. Methods and Devices for Efficient Deconvolution by Reducing an Amount of Computations for Dot Product Operations Disclosed herein include embodiments of a system, a method, and a device for improving computational efficiency of deconvolution (sometimes referred to as deconvolution process or deconvolution operation) by reducing an amount of computations for dot products. In one aspect, the disclosed deconvolution is performed to generate or obtain an upscaled image for an input image. The upscaled image has a higher resolution or has a larger number of pixels than the input image.

In some embodiments, an input image having a set of pixels is received. A first dot product may be performed on a subset of the set of pixels of the input image and a portion of a kernel, to generate a first pixel of an output image. In one aspect, a number of multiplications performed for the first dot product may be less than a number of elements of the kernel. A second dot product on a remaining portion of the kernel to generate the first pixel of the output image may be bypassed or omitted, thereby using less computational resources and reducing power consumption.

Advantageously, the disclosed deconvolution achieves computational efficiency by reducing a number of computations (e.g., multiplications and accumulations) of dot products. In one implementation, an intermediate image having a larger size or a larger number of pixels than the input image is obtained by adding or padding pixels with a predetermined value (e.g., '0'). Then, in one implementation, the intermediate image may be convolved with a kernel to generate a pixel of the output image. In one implementation, dot product operations may be performed on different subsets of the intermediate image and the kernel to generate different pixels of the output image. Performing a dot product operation on a subset of the intermediate image with the kernel may involve a number of multiplications and a number of accumulations that correspond to the number of elements of the kernel. Assuming for an example that a dimension of the kernel is 3 by 3, then generally 9 multiplications and 8 accumulations may be performed to generate a pixel of the output image. In one aspect, the disclosed deconvolution exploits the characteristic that a dot product operation performed on the padded or added pixels having the predetermined value (e.g., null data) with a corresponding portion of the kernel would not affect the value of the pixel. Hence, the disclosed deconvolution may bypass, avoid, skip or omit dot product operations on the corresponding portion of the kernel to reduce a number of dot product operations to generate a pixel of the output image.

Advantageously, the disclosed deconvolution achieves further computational efficiency by obviating generation of the intermediate matrix. In one approach, for each pixel of the output image, one or more pixels of the input image and a corresponding portion of the kernel to perform a dot product operation can be determined and stored as mapping information. The corresponding portion of the kernel can refer to elements of the kernel at locations corresponding to or aligned with locations of the one or more pixels of the input image. According to the mapping information, a dot product can be performed on associated pixels of the input image and the corresponding portion of the kernel to generate the output image, without generating or constructing the intermediate image. By obviating construction of the intermediate image, the disclosed deconvolution can be performed faster with less computational resources (e.g., processing components or storage resource).

Figure 2:
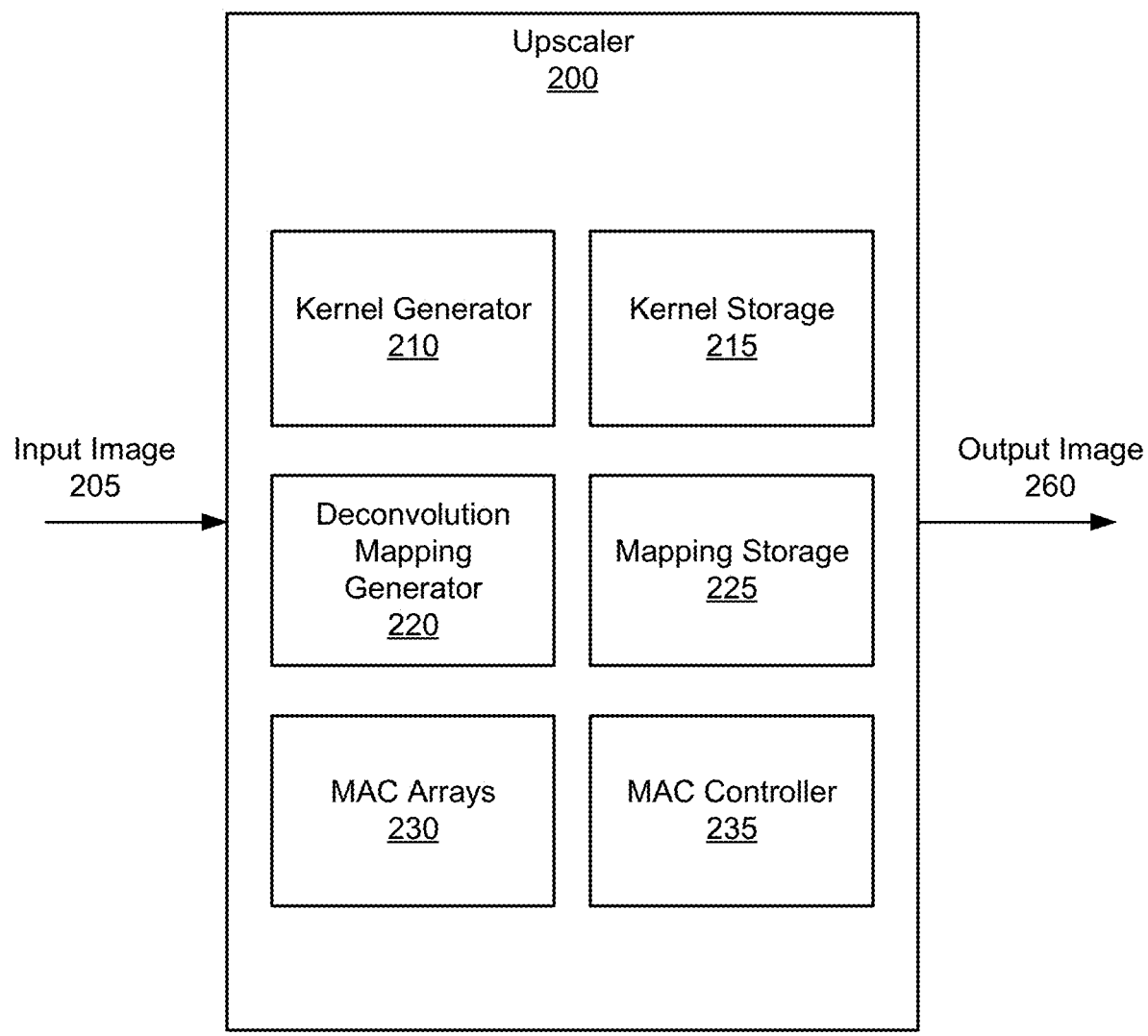
FIG. 2 is a block diagram of an upscaler, according to an example implementation of the present disclosure.

Referring to FIG. 2, illustrated is a block diagram of an upscaler 200, according to an example implementation of the present disclosure. In some embodiments, the upscaler 200 includes or is embodied as the system of FIG. 1A. In some embodiments, the upscaler 200 includes a kernel generator 210, a kernel storage 215, a deconvolution mapping generator 220, mapping storage 225, MAC arrays 230, and/or a MAC controller 235. These components may operate together to receive an input image 205 and perform deconvolution on the input image 205 to generate an output image 260 having a higher resolution or a higher number of pixels than the input image 205. The input image 205 may have pixels having values in a RGB color space or in any color space (e.g., a YCbCr, etc.). In other embodiments, the upscaler 200 includes more, fewer or different components than shown in FIG. 2. Each of the components disclosed herein is implemented in hardware or at least a combination of hardware and software.

The kernel generator 210 can be or include a component that generates a kernel and stores the kernel in or using the kernel storage 215. The kernel may have elements in a matrix form or arrangement, where each element of the kernel may be multiplied by a corresponding pixel of an image to be convolved with the kernel. Each element may have a value in an integer form or a decimal form. In some embodiments, the kernel generator 210 automatically generates the kernel according to a predetermined set of elements. For example, the elements of the kernel may be determined through training of a neural network. In some embodiments, the kernel generator 210 receives, for example through a user interface, a user input specifying one or more elements of the kernel, and allows elements of the kernel to be modified according to the user input. A number of elements or a size or dimension of the kernel may be predefined or may be configurable.

The deconvolution mapping generator 220 can be or include a component that generates mapping information. In one aspect, the mapping information indicates, for each pixel of the output image 260, one or more pixels of the input image 205 and a corresponding portion (or corresponding elements) of the kernel to perform a dot product operation. In another aspect, the mapping information indicates, for each pixel of the output image 260, a portion of the kernel, on which a dot product operation can be bypassed, skipped, avoided or omitted. The mapping information can include any type or form of rules, indicators and/or descriptions of locations, pixels, coordinates, matrix elements or (relative or absolute) spatial information, to indicate portion(s) of the kernel to perform a dot product operation, and/or portion(s) of the kernel to bypass a dot product operation. To generate a pixel of an output image, a dot product operation on the portion of the kernel may be omitted, because a dot product operation performed on or using the portion of the kernel would not affect (e.g., provide or generate information about) the pixel of the output image. For example, the mapping information can indicate that to generate a first pixel of the output image 260, a dot product operation may be performed on a first pixel of the input image and a first element of the kernel, where a dot product operation on other elements of the kernel may be bypassed or omitted to generate the first pixel of the output image 260. The deconvolution mapping generator 220 may store the mapping information in or using a mapping storage 225.

In some embodiments, the deconvolution mapping generator 220 automatically generates the mapping information. In one approach, the deconvolution mapping generator 220 may obtain first mapping information indicating a mapping relationship between pixels of the input image 205 and pixels of an intermediate image. The intermediate image may have pixels with a predetermined value (e.g., null data) padded around/between or interspersed among pixels of the input image 205 at predetermined locations. In one example, each pixel from the input image 205 may be surrounded or interspersed by the padded pixels having null data. The deconvolution mapping generator 220 may also obtain second mapping information indicating, for each pixel of the output image 260, a corresponding subset of pixels of the intermediate image to perform dot product operations with the kernel. The deconvolution mapping generator 220 may combine or synthesize the first mapping information and the second mapping information to automatically generate the mapping information indicating, for each pixel of the output image 260, one or more pixels of the input image 205 and a corresponding portion (or one or more corresponding elements) of the kernel to perform a dot product operation.

For example, the deconvolution mapping generator 220 can determine that an intermediate image would have certain pixels with null data at predetermined locations, and certain pixels mapped to pixels of the input image at other locations. The deconvolution mapping generator 220 may also determine that, for each pixel of the output image 260, which elements of the kernel would be applied to or multiplied by (e.g., correspond to) the null data of the intermediate image and which elements of the kernel would be applied to or multiplied by (e.g., correspond to) pixels mapped to the input image 205. For each pixel of the output image 260, the deconvolution mapping generator 220 may determine that, a dot product operation should be performed on pixels of the intermediate image mapped to pixels of the input image 205 and a corresponding portion of the kernel. Moreover, for each pixel of the output image 260, the deconvolution mapping generator 220 may determine that a dot product operation may be bypassed or omitted for pixels of the intermediate image having the null data and the corresponding elements of the kernel.

The MAC arrays 230 may be arrays of MAC units 140. The MAC controller 235 can be or include a component that configures the MAC arrays 230 to perform deconvolution or upscaling of an input image. The MAC controller 235 may receive the input image from a storage or another device, and the kernel from the kernel storage 215. The MAC controller 235 may apply pixels of the input image as first inputs of the MAC arrays 230 and apply corresponding elements of the kernel as second inputs to the MAC arrays 230, such that the MAC arrays 230 can perform a dot product operation on the received inputs to generate pixels of the output image 260. In one implementation, a MAC unit 140 is applied with a subset of pixels of the input image and a subset of corresponding elements of the kernel, such that the MAC unit 140 can generate or output a corresponding pixel of the output image 260 with a reduced number of multiplications for the dot product operation. The MAC controller 235 may configure different MAC units 140 to generate pixels of the output image simultaneously or in parallel. For example, each MAC unit 140 may be applied with a corresponding set of pixels of the input image 205 and a corresponding set of elements of the kernel 345 as inputs. Alternatively or additionally, the MAC controller 2365 may configure the same MAC unit 140 to generate different pixels of the output image at different times (e.g., sequentially). For example, a MAC unit 140 may be applied with a first subset of pixels of the input image 205 and a first subset of elements of the kernel 345 as inputs at a first time, and the same MAC unit 140 may be applied with a second subset of pixels of the input image 205 and a second subset of elements of the kernel 345 as inputs at a second time. By reusing the same hardware component, computational resource may be conserved.

In one aspect, the MAC controller 235 obtains or receives mapping information from the mapping storage 225, and determines, for a pixel of the output image 260, a dot product operation with a reduced amount of computations according to the mapping information. The MAC controller 235 may configure, for a pixel of the output image 260, the MAC unit 140 to perform a reduced number of dot product operations according to the mapping information by applying a subset of pixels of the input image 205 and a corresponding portion of the kernel for generating the pixel as indicated by the mapping information. For example, rather than performing a dot product operation on 9 pixels of the input image 205 and 9 elements of a 3 by 3 kernel, the MAC controller 235 may perform a dot product on one pixel of the input image 205 and one element of the 3 by 3 kernel as indicated by the mapping information. Additional examples and description of the operation of the MAC controller 235 are provided below with respect to FIGS. 3 through 5.

Referring to FIG. 3, illustrated are an example input image 205, an intermediate image 315, and an upscaled image 260 to illustrate a process of upscaling the input image 205, according to an example implementation of the present disclosure. In one example, the input image 205 has 9 pixels i1, i2 . . . i9. In one example, the intermediate image 315 having 81 pixels may be generated by adding or padding pixels having a predetermined value (e.g., null, empty or invalid data represented in grey) to pixels of the input image 205. For example, the padded pixels having null data may surround and/or interspersed the pixels of the input image 205. In one example, the intermediate image 315 may be convolved with a kernel 345 to generate an output image 260 having 49 pixels. In the example shown in FIG. 3, the kernel 345 has 9 elements k1, k2, k3 . . . k9. In one example, different dot products are performed on different subsets of the intermediate image 315 and the kernel 345 to generate the output image 260. For example, a dot product may be performed on a subset 318A of the intermediate image 315 and kernel 345 to generate a pixel (0,0) of the output image 260. For another example, a dot product may be performed on another subset 318B of the intermediate image 315 to generate a pixel (0,6) of the output image 260.

In one aspect, generating the intermediate image 315 and convolving the intermediate image 315 with the kernel 345 to generate the output image 260 are computationally inefficient. For example, generating the intermediate image 315 consumes storage resources to store 81 pixels. Then, convolving the intermediate image 315 with the kernel involves 441 multiplications. Although the example shown in FIG. 3 shows the input image 205 having a size of 3 by 3, the intermediate image 315 having a size of 9 by 9, and the output image 260 having a size of 7 by 7, in other applications the input image 205, the intermediate image 315, and the output image 260 may have different or larger sizes than shown in FIG. 3. For example, to generate a 1024 by 768 image, the number of multiplications and accumulations may exceed tens or hundreds of millions.

In one approach, the disclosed deconvolution or upscaling can be performed with improved efficiency or with less computational resources by bypassing, avoiding, skipping or omitting computations for dot product operations. For example, referring to FIGS. 4A through 4D, illustrated are example dot products performed to obtain pixels of an upscaled image by bypassing or omitting computations, according to an example implementation of the present disclosure. In one example, mapping information indicates, for each pixel of the output image 260, a dot product to perform on a corresponding subset of pixels of the input image 205 and a corresponding portion of the kernel 345. The MAC controller 235 may perform a dot product operation on a subset of pixels of the input image 205 and a corresponding portion of the kernel 345 to generate a pixel of the output image 260 as indicated by the mapping information.

Figure 4A:
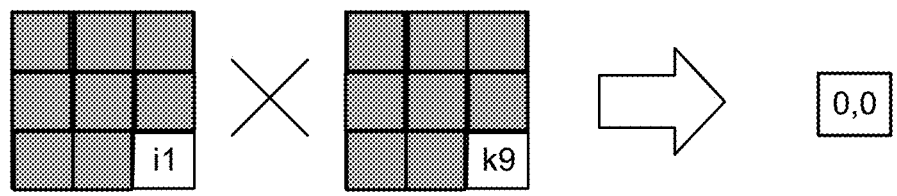
FIGS. 4A through 4D show example dot products performed to obtain pixels of an upscaled image, according to an example implementation of the present disclosure.
Figure 4B:
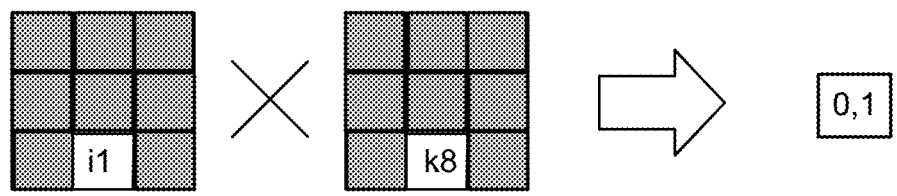
Figure 4C:
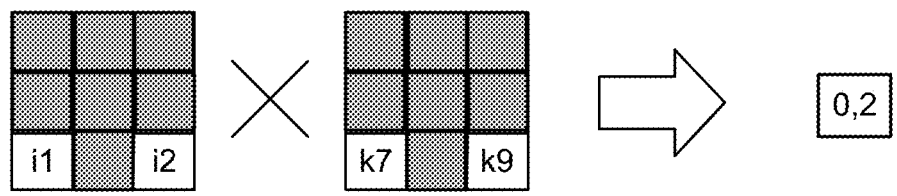
Figure 4D:
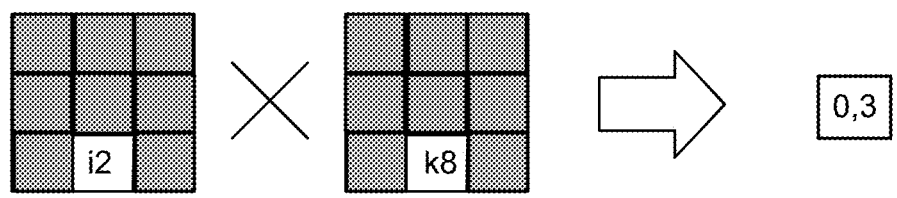

For example, in FIG. 4A, to generate the pixel (0,0) of the output image 260, a dot product operation may be performed on the pixel i1 of the input image 205 with the element k9 of the kernel 345. A dot product operation on the remaining elements of the kernel 345 (greyed out) may be bypassed or omitted to generate the pixel (0,0), because a dot product operation on the remaining elements of the kernel 345 with corresponding pixels of the intermediate image 315 would not affect (e.g., would not impart any value, significance or information to) the pixel (0,0), since the corresponding pixels of the intermediate image 315 have null data. For another example in FIG. 4B, to generate the pixel (0,1) of the output image 260, a dot product operation may be performed on the pixel i1 of the input image 205 with the element k8 of the kernel 345. A dot product operation on the remaining elements of the kernel 345 (greyed out) may be bypassed or omitted to generate the pixel (0,1), because a dot product operation on the remaining elements of the kernel 345 with corresponding pixels of the intermediate image 315 would not affect the pixels (0,1), since the corresponding pixels of the intermediate image 315 have null data. For another example in FIG. 4C, to generate the pixel (0,2) of the output image 260, a dot product operation may be performed on the pixels i1, i2 of the input image 205 with the element k7, k9 of the kernel 345. For another example in FIG. 4D, to generate the pixel (0,3) of the output image 260, a dot product operation may be performed on the pixel i2 of the input image 205 with the element k8 of the kernel 345.

Advantageously, by performing a dot product operation on a subset of pixels and a portion of the kernel and by bypassing a dot product operation on the remaining portion of the kernel, a number of multiplications and accumulations can be significantly reduced (e.g., by 70 to 80%, or more in some cases). Moreover, generating or constructing the intermediate image 315 can be omitted to achieve savings in computational resource, because dot product operations associated with padded images of the intermediate image 315 with null data can be bypassed or omitted.

Figure 5:
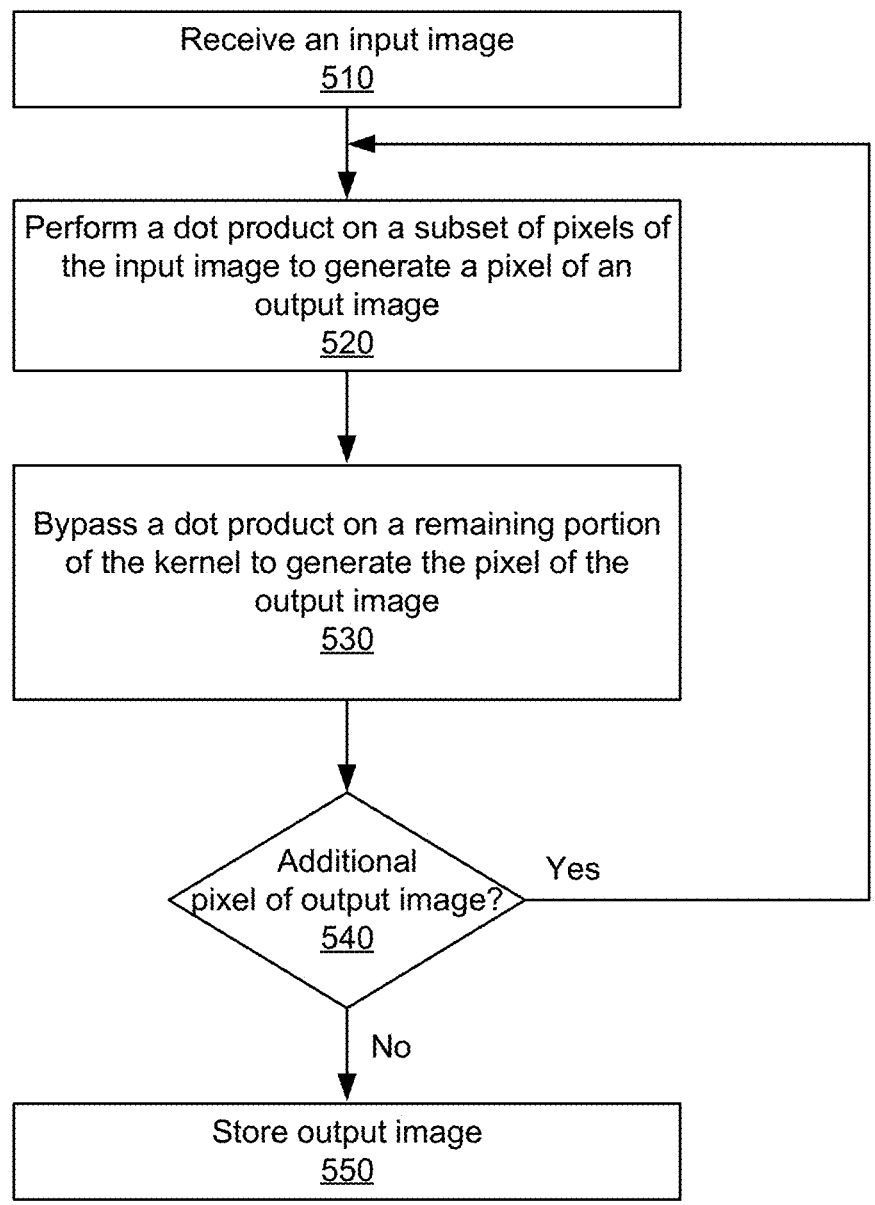
FIG. 5 is a flow chart illustrating a process of upscaling an image, according to an example implementation of the present disclosure.

Referring to FIG. 5, illustrated is a flow chart illustrating a process 500 of upscaling an input image to generate an output image having a larger number of pixels or higher resolution than the input image, according to an example implementation of the present disclosure. In some embodiments, the process 500 is performed by the upscaler 200 of FIG. 2. In some embodiments, the process 500 is performed by other entities. In some embodiments, the process 500 includes more, fewer, or different steps than shown in FIG. 5.

In one approach, the upscaler 200 receives 510 the input image to be upscaled. In one approach, the upscaler 200 selects a pixel of the output image to be generated, and performs 520 a dot product on a subset of the pixels of the input image and a portion (or a subset of elements) of a kernel to generate the selected pixel of the output image. The kernel may be predetermined or reconfigurable. In one approach, the upscaler 200 bypasses 530 a dot product on a remaining portion of the kernel to generate the pixel of the output image.

In general, a number of multiplications performed for a dot product to generate the selected pixel of the output image is less than a number of elements of the kernel. In one example, dot product operations may be performed on the same pixel of the input image but with different elements of the kernel to generate different pixels of the output image. For example, the pixel (0,0) of the output image may be obtained by multiplying the pixel i1 with the element k9 of the kernel, and the pixel (0,1) of the output image may be obtained by multiplying the pixel i1 with the element k8 of the kernel. In another example, dot product operations may be performed on different pixels of the input image but with the same element of the kernel to generate different pixels of the output image. For example, the pixel (0,1) of the output image may be obtained by multiplying the pixel i1 with the element k8 of the kernel, and the pixel (0,3) of the output image may be obtained by multiplying the pixel i2 with the element k8 of the kernel. In another example, dot product operations may be performed with different numbers of multiplications and accumulations to generate different pixels of the output image. For example, the pixel (0,1) of the output image may be obtained by multiplying the pixel i1 with the element k8 of the kernel, where the pixel (0,2) of the output image may be obtained by multiplying the pixel i1 with the element k7 of the kernel and multiplying the pixel i2 with the element k9 of the kernel and adding two multiplication results.

In one approach, the upscaler 200 may obtain mapping information indicating, for each pixel of the output image 260, a dot product to perform on a corresponding subset of pixels of the input image and a corresponding portion of the kernel. According to the mapping information, the upscaler 200 may determine, for the selected pixel, a subset of pixels of the input image and a corresponding portion of the kernel, and perform a dot product operation on the determined subset of pixels of the input image and the corresponding portion of the kernel. In one aspect, the mapping indicates, for each pixel of the output image 260, a dot product on a remaining portion of the kernel to bypass or omit. According to the mapping information, the upscaler 200 may determine, for the selected pixel, a remaining portion of the kernel, and bypass or omit a dot product operation on the determined remaining portion of the kernel.

In one approach, the upscaler 200 determines 540 whether there is an additional pixel of the output image to be generated. In response to determining that there is an additional pixel of the output image to be generated, the upscaler 200 may return to the step 520 to generate the additional pixel. In response to determining that there is no additional pixel of the output image to be generated, the upscaler 200 may store and/or provide the output image to another device or render the output image for display.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:
1. A method comprising:
 performing, by one or more processors according to predetermined mapping information, a first dot product on a first subset of a set of pixels of an input image and a portion of a kernel, to generate a first pixel of an output image;

bypassing, by the one or more processors according to the predetermined mapping information, a second dot product on a second subset of the set of pixels of the input image and a remaining portion of the kernel to generate the first pixel of the output image; and performing, by the one or more processors, a third dot product on i) the first subset of the set of pixels of the input image and ii) another portion of the kernel to generate a second pixel of the output image.

2. The method of claim 1, further comprising:

identifying, by the one or more processors according to the predetermined mapping information indicating a corresponding dot product to bypass for each pixel of the output image, the second dot product to bypass for the first pixel of the output image; and bypassing, by the one or more processors according to the predetermined mapping information, the second dot product on the remaining portion of the kernel to generate the first pixel of the output image.

3. The method of claim 1, further comprising:

identifying, by the one or more processors according to the predetermined mapping information indicating a corresponding dot product to perform for each pixel of the output image, the first dot product to perform for the first pixel for the output image; and performing, by the one or more processors according to the predetermined mapping information, the first dot product on the first subset of the set of pixels of the input image and the portion of the kernel, to generate the first pixel of the output image.

4. The method of claim 1, wherein the output image has more number of pixels than the input image.

5. The method of claim 1, wherein the number of multiplications performed for the first dot product to generate the first pixel of the output image is same as a number of multiplications performed for the third dot product to generate the second pixel of the output image.

6. The method of claim 1, further comprising:

performing, by the one or more processors, a third dot product on i) another subset of the set of pixels of the input image and ii) the portion of the kernel, to generate a second pixel of the output image.

7. The method of claim 6, wherein the number of multiplications performed for the first dot product to generate the first pixel of the output image is same as a number of multiplications performed for the third dot product to generate the second pixel of the output image.

8. The method of claim 1, further comprising:

performing, by the one or more processors, a third dot product on i) another subset of the set of pixels of the input image and ii) another portion of the kernel, to generate a second pixel of the output image.

9. The method of claim 8, wherein the number of multiplications performed for of the first dot product to generate the first pixel of the output image is different from a number of multiplications performed for the third dot product to generate the second pixel of the output image.

10. A system comprising:

one or more processors configured to:

perform, according to predetermined mapping information, a first dot product on a first subset of a set of pixels of an input image and a portion of a kernel, to generate a first pixel of an output image; and bypass, according to the predetermined mapping information, a second dot product on a second subset of the set of pixels of the input image and a remaining portion of the kernel to generate the first pixel of the output image; and perform a third dot product on i) the first subset of the set of pixels of the input image and ii) another portion of the kernel to generate a second pixel of the output image.

11. The system of claim 10, wherein the one or more processors are configured to:

identify, according to the predetermined mapping information indicating a corresponding dot product to bypass for each pixel of the output image, the second dot product to bypass for the first pixel of the output image; and bypass, according to the predetermined mapping information, the second dot product on the remaining portion of the kernel to generate the first pixel of the output image.

12. The system of claim 10, wherein the one or more processors are configured to:

identify, according to the predetermined mapping information indicating a corresponding dot product to perform for each pixel of the output image, the first dot product to perform for the first pixel of the output image; and perform, according to the predetermined mapping information, the first dot product on the first subset of the set of pixels of the input image and the portion of the kernel, to generate the first pixel of the output image.

13. The system of claim 10, wherein the output image has more number of pixels than the input image.

14. The system of claim 10, wherein the number of multiplications performed for the first dot product to generate the first pixel of the output image is same as a number of multiplications performed for the third dot product to generate the second pixel of the output image.

15. The system of claim 10, wherein the one or more processors are configured to:

perform a third dot product on i) another subset of the set of pixels of the input image and ii) the portion of the kernel, to generate a second pixel of the output image.

16. The system of claim 15, wherein the number of multiplications performed for the first dot product to generate the first pixel of the output image is same as a number of multiplications performed for the third dot product to generate the second pixel of the output image.

17. The system of claim 10, wherein the one or more processors are configured to:

perform a third dot product on i) another subset of the set of pixels of the input image and ii) another portion of the kernel, to generate a second pixel of the output image.

18. The system of claim 17, wherein the number of multiplications performed for the first dot product to generate the first pixel of the output image is different from a number of multiplications performed for the third dot product to generate the second pixel of the output image.

* * * * *